Dec. 28, 1943.  E. B. COLLINS  2,337,545
STAR FINDER
Filed Dec. 11, 1942   3 Sheets-Sheet 1
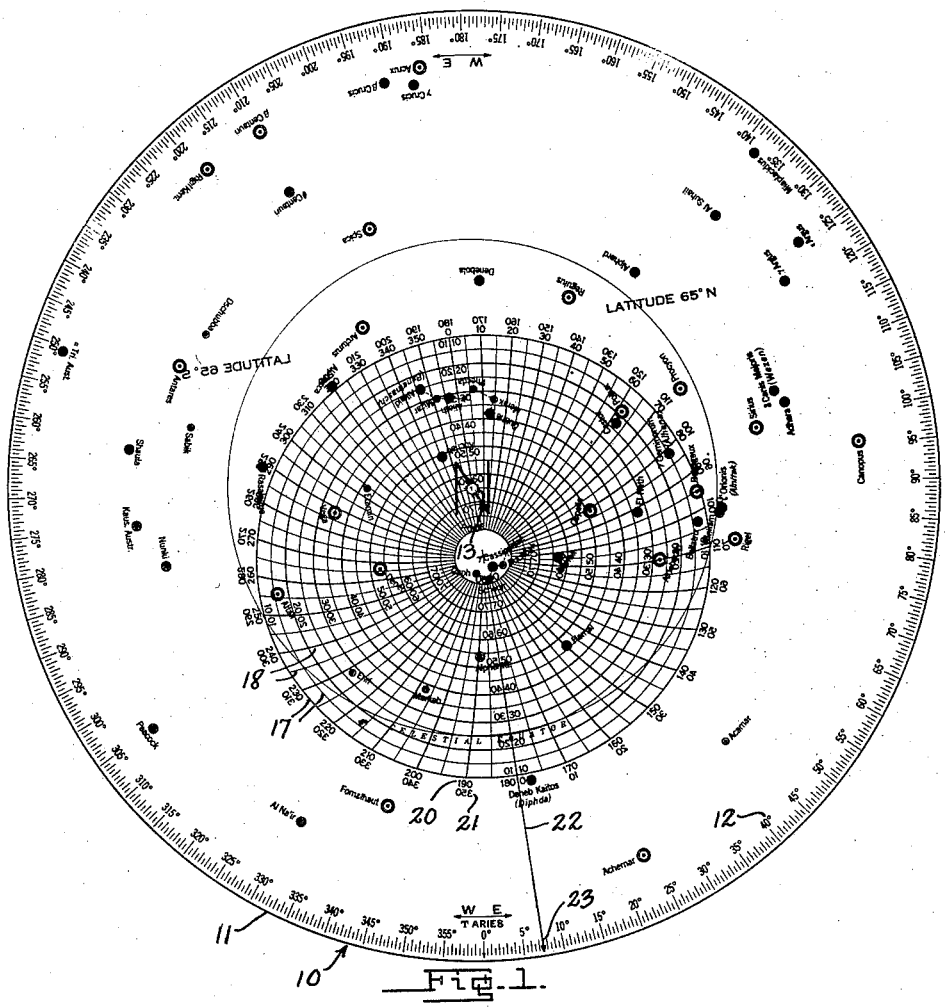
Fig. 1.
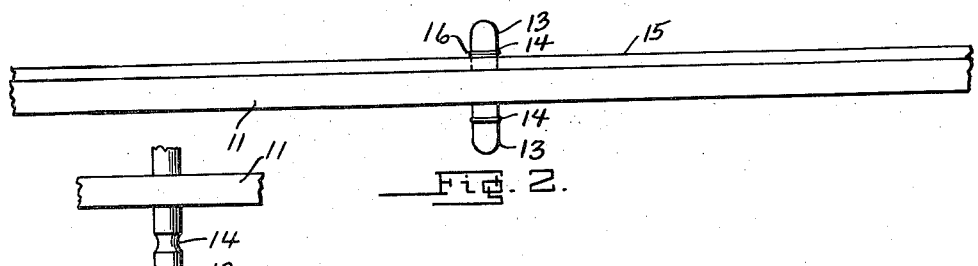
Fig. 2.
Fig. 3.
INVENTOR
E. B. Collins
BY
ATTORNEY Dec. 28, 1943.    E. B. COLLINS    2,337,545
STAR FINDER
Filed Dec. 11, 1942    3 Sheets-Sheet 2

INVENTOR
E. B. Collins
BY
ATTORNEY

Dec. 28, 1943.   E. B. COLLINS   2,337,545
STAR FINDER
Filed Dec. 11, 1942   3 Sheets-Sheet 3

INVENTOR
E. B. Collins
BY
ATTORNEY

Patented Dec. 28, 1943

2,337,545

UNITED STATES PATENT OFFICE 2,337,545

STAR FINDER

Elmer B. Collins, Washington, D. C.

Application December 11, 1942, Serial No. 468,647

5 Claims. (Cl. 35—44)

(Granted under the act of March 3, 1883, as amended April 30, 1928; 370 O. G. 757)

This invention relates to a star finder, especially useful for aviators but likewise useful for mariners in quickly and easily finding or identifying any one of the particular visible stars usually used in navigator's problems.

A further object of this invention is to aid in the identification of any observed unknown star or planet when the celestial body's altitude has been measured with a sextant or bubble octant, as customary, and its bearing simultaneously noted from the plane's or ship's compass.

A further object of this invention is to provide a star finder which permits the selection of favorable bearing of stars at dawn or twilight near the ship's or plane's dead reckoning position for the later purpose or permitting the determination of the true position of the craft on the earth's surface.

A further object of this invention is to provide a star finder which is small, handy, convenient and compact and which may be quickly manipulated and held in one hand during operation, leaving the operator's other hand free for other operations.

A further object of this invention is to provide a star finder especially meeting the need of the aviator because of the simplicity of its initial setting and ease of manipulation of an attached swinging template with all readings made by mere eye inspection.

A further object of this invention is to provide an improvement over the invention shown in the inventor's Patent No. 2,304,797, of December 15, 1942, issued on application Serial No. 418,887, filed November 13, 1941, for a Star finder.

Still a further object of this invention is to provide a novel and improved cooperating means on the star base and template shown in the above-mentioned patent, as a result of which only a single star base is needed instead of seven star bases, and only seven templates are needed instead of seven pairs of templates, as in the above-mentioned patent, and as a result of these improvements a star finder is provided that will perform all of the functions and have all of the conveniences set forth in the above-mentioned patent at a considerable saving in the weight of the complete star finder.

Still a further object of this invention is to provide an improved template which will furnish all the data given by the pair of templates in the above-mentioned patent and which improved template may be used for either north or south latitude and may be placed on the proper north or south side of the star base.

With the foregoing and other objects in view, the invention consists in the construction, combination and arrangement of parts hereinafter described and illustrated in the drawings, in which, Fig. 1 is an elevational plan view of the star finder of this invention;

Fig. 2 is a greatly magnified edge view, with the ends partly broken away, of Fig. 1;

Fig. 5 is a fragmentary view showing the undercut on the nub.

Figure 3:
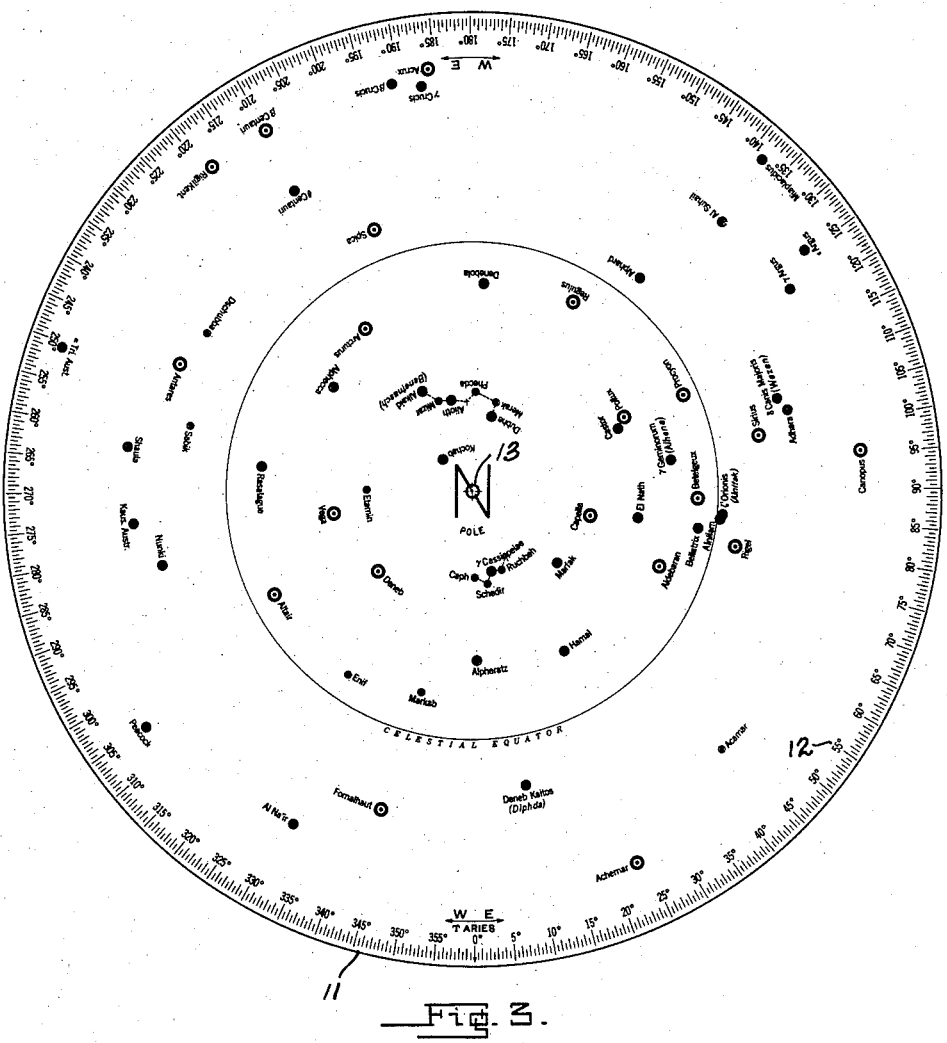
Fig. 3 is an elevational plan view of the north side of the star base of this invention, being on the same scale as Fig. 1.

The star finder 10 of this invention includes a circular stationary star base 11 which, in actual construction, may be approximately eight to eight and one-half inches in diameter, more or less. Shown on the star base 11 is a polar azimuthal equidistant projection of the stars. On the obverse side, shown in the drawings, this star base 11 illustrates all the bright navigational stars of the northern hemisphere with the North Pole shown at the center of the base, while on the reverse side is shown the bright navigational stars of the southern hemisphere with the South Pole located at the center of the star base. On the outer periphery of both sides of the circular star base 11 is shown a divided time scale 12 indicating the hour angle of Aries in half degrees of arc, although it will be understood that this can be indicated in hours or minutes of sidereal time. The time is marked to increase in value counterclockwise to the westward, although it can equally be marked to increase in value clockwise to the eastward, as it is in the aforementioned patent.

Figure 4:
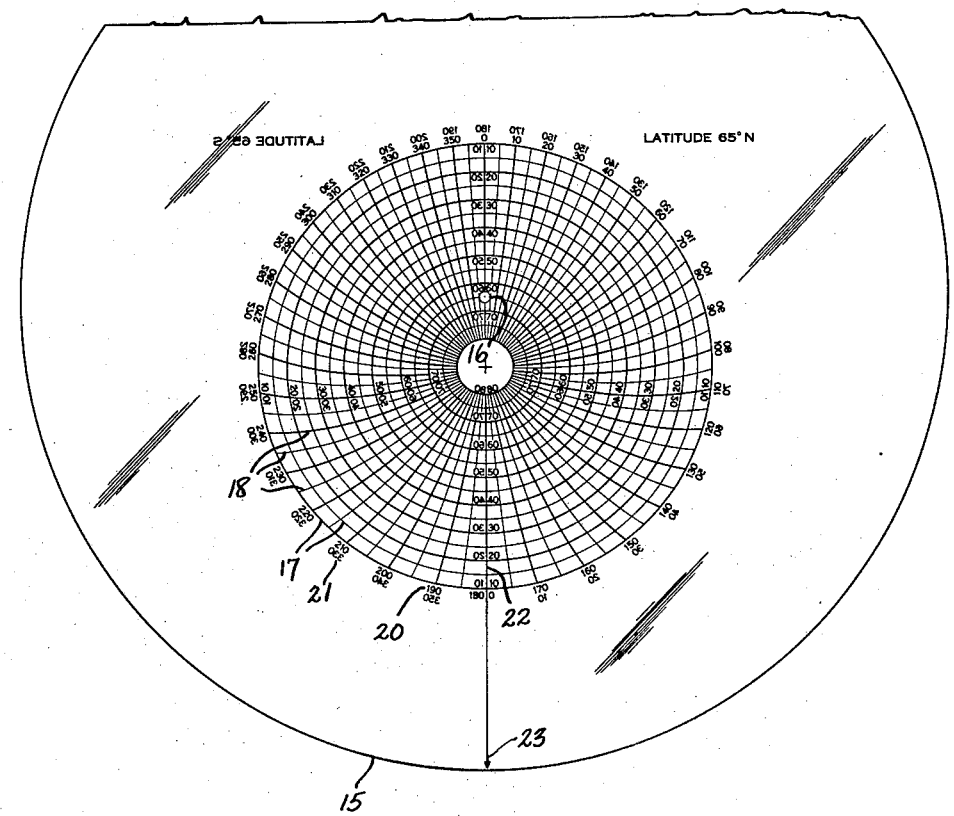
Fig. 4 is an elevational plan view of one of the templates of this invention.

Extending through the opposite sides of the star base 11 and located at the pole center thereof is a nub 13 which is slightly undercut as at 14, which may be filled with a small rubber washer. Adapted to be placed over the nub 13 on either side thereof is a template 15 having a center hole 16 of a diameter substantially identical with the diameter of the nub 13, so that when the template 15 is placed on the base 11, the hole 16 provides a snug fit over the nub 13 and tends to hold the template 15 rotatably in position on the base 11. The undercut 14 of nub 13 is spaced from the face of the star base 11 a distance substantially equal to or slightly greater than the thickness of the template 15, as a result of which when the template 15 is placed on either face of the star base 11 the template opening 16 fitting snugly about the nub 13 tends to abut against the undercut edge 14 sufficiently to prevent accidental removal of the template 15 from the base 11, yet permits it to be readily removed therefrom when such action is deliberately taken. This template 15, as shown separately in Fig. 4, is made of transparent material, the one shown in Fig. 4 having been plotted for the latitude of 65 degrees.

It will be observed that this template 15 can be used in either north latitude or south latitude by merely turning it from one side to the other. It will be noted that it is printed with the words "Latitude 65° N." and with a set of numerals corresponding thereto and rotatable from one side thereof. Rotatable from the opposite side are the words "Latitude 60° S." with a set of numerals readable only from the other side, although the material being absolutely transparent, the print is visible from both sides, one set of printed letters always appearing in reverse and is to be ignored, while that set that is readable to the eye is to be used.

The template 15, as shown, has been plotted for a latitude of 65 degrees and can be used without any appreciable error for at least 5 and possibly 10 degrees either side thereof. It is contemplated, however, to provide a separate template for each 10 degrees of latitude, whereby the maximum error for any location would at most be 5 degrees from the nearest template. Such error, however, can easily be interpolated in use and does not affect the final result whatsoever. These templates are made of transparent material on which calculated curves are imprinted in such a manner that the star positions on the base 11 are visible therethrough.

The complete star finder consists of one star base and seven templates, each template being calculated for the different latitude bands from 5 to 75 degrees latitude north or south. The marked curves 17 of equal latitude in each template 15 show the altitudes from 10 degrees above the horizon to the zenith of 90 degrees. The marked curves 18 of equal azimuth on each template show azimuths from 0° to 360 degrees. The inner degrees of azimuth 20 readable with the words "Latitude 65° N." as on the drawings, are used with the north projection shown on the obverse face of the star base 11, while the outer degrees of azimuth 21, which are readable when the template 15 is turned over to make the words "Latitude 65° S." are used when the template is placed on the reverse face showing the southern hemisphere.

The 180° line 22 marks the position of the observer's local meridian and is shown on the template 15 by an index marker 23 which, when set on scale 12 of the star base 11 for any given selected time of observation, automatically orients the template 15 in its true and proper position with respect to the visible stars in the sky. The star base 11 and the template 15 are of substantially the same size and the template is detachably and rotatably secured to the star base by means of the nub 13 and its undercut 14. By setting the arrow or marker index 23 for any specified watch time on the periphery scale 12 of the star base 11, the lines of altitude 17 and of azimuth 18 printed on the template 15 are oriented into a true position with respect to the starry heavens above. The miniature view on the star finder corresponds to the actual visible view as seen by the observer, so that on the curves shown on the template 15 the altitude 17 and azimuth 18 of any star may be conveniently and easily read by mere eye inspection.

In operation the star finder is used for indicating the visible stars available for observation, especially for advanced observation at twilight for a fix of a vessel's position. The navigator or aviator selects the particular template suitable for the band of latitude in which he is located, which band he will know from dead reckoning. He then pivots the selected template over the star finder, bringing marker line 23 into coordination with the peripheral time scale of the star base, which time scale he uses in accordance with customary practice in coordination with the almanac chart and chronometer. Having thus oriented the template over the star base he can by mere eye inspection of the template determine at what altitude and at what bearing he will find any particular bright navigational star in the heavens.

Thus, looking at the particular star finder shown in Fig. 1, Vega is found to be located at an altitude of 45 degrees and a bearing of 288 degrees. By directing his sextant or octant approximately to this particular altitude and bearing, he will immediately locate and be able to make an accurate observation with his instrument on this particular star. This procedure is possible even though at twilight or dawn the stars are not easily visible to the naked eye when it is therefore particularly difficult to identify a particular star from its location in the constellation to which is may belong.

Having found any particular star visible in the heavens at dawn or twilight, such star can be identified by a reverse of the above proceeding; that is, after observing the star through his instrument and determining its altitude and taking its bearings from the compass, he can then use these coordinates on the star finder, and thus identify the star that is barely visible through his instrument.

Other modifications and changes in the number and arrangement of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A star finder for use at or close to a particular latitude comprising a circular star base having a polar azimuthal equidistant projection including a plurality of bright navigational stars shown thereon and a divided time scale adjacent the periphery thereof, a transparent template having marked thereon curves of equal altitude and lines of equal azimuth for the particular latitude at which it is to be used and data appropriate to said curves and lines printed on said transparent template, part of said data appropriate to one navigational hemisphere being in obverse and part of said data appropriate to the other navigational hemisphere being in reverse, and cooperating means on said star base and said template for detachably securing and rotationally pivoting said template to either side of said star base, said cooperating means including an aperture in said template located at its pivoting point and a hub on said star base located at the pole of the projection thereon, said aperture of said template fitting snugly yet rotationally and detachably over said nub.

2. A star finder for use at or close to a particular latitude comprising a circular star base having a polar azimuthal equidistant projection including a plurality of bright navigational stars shown thereon and a divided time scale adjacent the periphery thereof, a transparent template having marked thereon curves of equal altitude and lines of equal azimuth for the particular latitude at which it is to be used, and cooperating means on said star base and said template for detachably securing and rotationally pivoting said template to said star base, said cooperating means including an aperture in said template located at its pivoting point and a nub on said star base located at the pole of the projection thereon, said aperture of said template fitting snugly yet rotationally and detachably over said nub, said nub having a slight groove at a distance from the face of the star base approximately equal to the thickness of the template.

3. A star finder for use at or close to a particular latitude comprising a circular star base having a polar azimuthal equidistant projection including a plurality of bright navigational stars shown thereon and a divided time scale adjacent the periphery thereof, a transparent template having marked thereon curves of equal altitude and lines of equal azimuth for the particular latiture at which it is to be used, cooperating means on said star base and said template for detachably securing and rotationally pivoting said template to said star base, said cooperating means including an aperture in said template located at its pivoting point and a nub on said star base located at the pole of the projection thereon, said aperture of said template fitting snugly yet rotationally and detachably over said nub, said nub having a slight groove at a distance from the face of the star base approximately equal to the thickness of the template, and a friction material filling said groove.

4. A star finder for use at or close to a particular latitude comprising a circular star base having a polar azimuthal equidistant projection including a plurality of bright navigational stars shown thereon and a divided time scale adjacent the periphery thereof, a transparent template having marked thereon curves of equal altitude and lines of equal azimuth for the particular latitude at which it is to be used, and cooperating means on said star base and said template for detachably securing and rotationally pivoting said template to said star base, said star base having a north projection on one side thereof and a south projection on the opposite side thereof, said template having a set of figures for a north latitude readable from one side thereof and another set of figures for a corresponding south latitude readable from the other side thereof and cooperating with the same set of curves thereon.

5. A star finder for use at or close to a particular latitude comprising a circular star base having a polar azimuthal equidistant projection including a plurality of bright navigational stars shown thereon and a divided time scale adjacent the periphery thereof, a transparent template having marked thereon curves of equal altitude and lines of equal azimuth for the particular latitude at which it is to be used, and cooperating means on said star base and said template for detachably securing and rotationally pivoting said template to said star base, said cooperating means including an aperture in said template located at its pivoting point and a nub on said star base located at the pole of the projection thereon, said aperture of said template fitting snugly yet rotationally and detachably over said nub, said star base having a north projection on one side thereof and a south projection on the opposite side thereof, said template having a set of figures for a north latitude readable from one side thereof and another set of figures for a corresponding south latitude readable from the other side thereof and cooperating with the same set of curves thereon, said nub extending through the opposite sides of said star base, whereby said template may be attached to cooperate with either side thereof.

ELMER B. COLLINS.